Patented Jan. 9, 1951

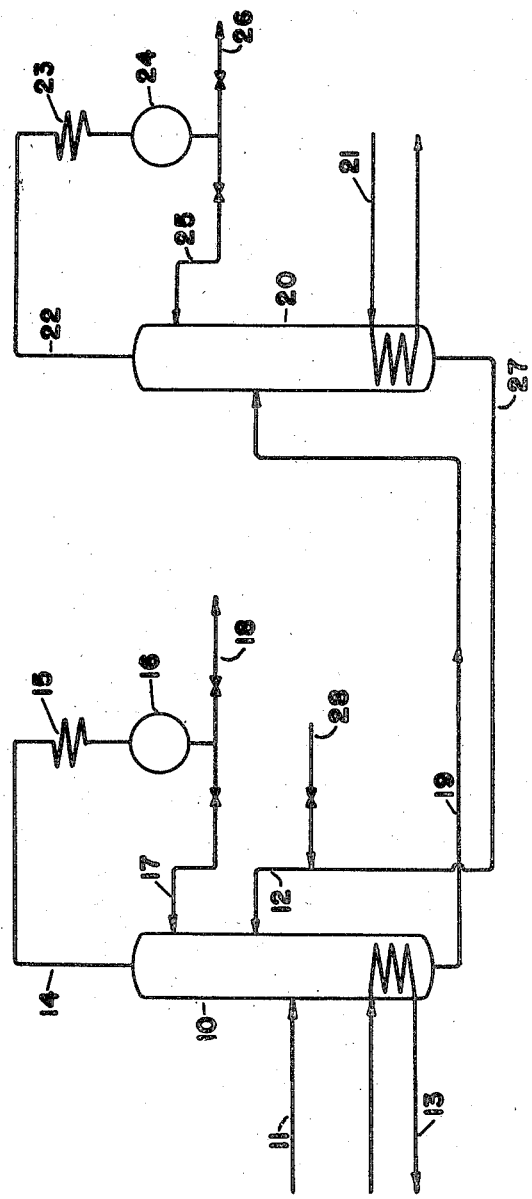

2,537,115

UNITED STATES PATENT OFFICE 2,537,115

EXTRACTIVE DISTILLATION OF ALCOHOLS

Edward George Scheibel, Nutley, N. J., assignor to Hoffmann-La Roche Inc., Nutley, N. J., a corporation of New Jersey Application July 23, 1948, Serial No. 40,216

6 Claims. (Cl. 202—39.5)

The present invention relates to a process for the extractive distillation of mixtures of different alcohols, by the employment of a selective solvent for one or a group of components of the mixture.

Mixtures of ethyl alcohol (B. P. 78.3° C.), isopropyl alcohol (B. P. 82.4° C.), and tertiary butyl alcohol (B. P. 82.9° C.), as for example, those obtainable in the manufacture of alcohols from petroleum, are not readily separable by ordinary distillation procedures because of their closely related boiling points.

The relative volatility of ethanol to isopropanol, or the volatility ratio, in the system ethanol-isopropanol is equal to the ratio of their vapor pressures, which is about 1.175. In general, the volatility ratio is the ratio of the per cent of the ethyl alcohol in the vapor to the per cent of the ethyl alcohol in the liquid mixture divided by the ratio of the per cent of isopropyl alcohol in the vapor to the per cent of isopropyl alcohol in the liquid mixture. To separate by ordinary distillation an ethanol-isopropanol mixture into its component alcohols of 99 per cent purity requires considerable fractionation. According to the present invention, it has been found that the separation of a mixture of ethyl alcohol and isopropyl alcohol into its components can be accomplished in a fractional distillation column with approximately half the column height and heat requirements. It will thus be evident that there is a significant saving in initial and operating costs by following the new procedure.

In general, the new process of separating alcohol mixtures having closely related boiling points, or azeotropic mixtures, involves carrying out the distillation in the presence of certain selective solvents which change the relative volatility from the ideal ratio of the vapor pressures of the alcohols, which is small because of their close boiling points, to a much larger volatility ratio. This increase in the relative volatilities of the components is believed to be due to a selective action of the solvent on one or a group of the components.

Separations can be obtained from mixtures of ethyl alcohol and isopropyl alcohol, of isopropyl alcohol and tertiary butyl alcohol, and of ethyl alcohol and tertiary butyl alcohol, or mixtures of all three of the alcohols. I have found certain solvents which do not form azeotropes with the components of the alcohol mixtures to be suitable for changing the relative volatilities or increasing the volatility ratio of the mixtures. Methyl-isobutyl-ketone, and higher boiling ketones, such as methyl-n-amyl-ketone have been found to be particularly effective for this purpose. Orthoxylene and other aromatic hydrocarbons boiling above about 145° C., such a p-cymene, have been found to be generally suitable. Mixtures of the aromatic hydrocarbons boiling above this temperature can also be employed. While high boiling paraffinic and naphthenic hydrocarbons, for example, boiling at 160° C. and above may be also employed, they would require the handling of larger quantities to be equally as effective as the aromatic hydrocarbons.

Ketones and particularly methyl-isobutyl-ketone, or higher boiling ketones, have been found to be somewhat more effective than the aromatic hydrocarbons in bringing about the separation of the alcohols. The lower boiling point of methyl-isobutyl-ketone makes it more desirable because its viscosity is lower at the operating temperature of the distillation column, so that its efficiency is higher than with any of the previously described solvents.

In practice, the process of the invention comprises the steps of contacting the alcoholic mixture to be separated in the vapor state; that is, in the distillation column with the appropriate solvent to produce enriched distillate and a solution from which the solvent can be removed for further contact with more of said mixture.

More particularly, the selective solvent for one or a group of the components of the alcohol mixture is passed down a fractionating column as vapors of the mixture pass upward, selectively dissolving the more soluble components which are withdrawn from the lower portion of the column as a solution in the solvent, and are separated therefrom, while the remaining component or components pass overhead. These steps, which are common in extractive distillation, may be carried out in any suitable manner known to those skilled in the art.

The accompanying drawing will serve to illustrate the invention. The figure represents a flow diagram of the extractive distillation process which I employ for the separation of the alcoholic mixtures, as for example, ethanol and isopropyl alcohol. Referring to the drawing, the mixture to be separated into its components is introduced as a vapor into distillation column 10 through line 11 where it countercurrently contacts the solvent introduced through line 12 to produce by fractionation, a vapor, as for example, ethyl alcohol; and a liquid phase, as for example, isopropyl alcohol and the solvent which may be o-xylene, methyl-isobutyl ketone, methyl-n-amyl-ketone or any of the aforementioned solvents. The distillation column 10 is a packed or bubble plate fractionating column well known to those skilled in the art. It is provided at its bottom with a reboiler 13 to vaporize the mixture and at its top with vapor line 14, condenser 15 and accumulator 16 to provide a reflux of the overhead produced to the column through line 17. The distillate product may be withdrawn through outlet line 18. The bottom product comprising the solvent and the dissolved component of the mixture, namely, the isopropyl alcohol, is withdrawn from column 10 through the bottom line 19 and is introduced into a stripper 20 to remove the solvent from said extract. The stripper column 20 is provided with a reboiler 21 at its bottom, top vapor line 22, condenser 23 and accumulator 24. Reflux line 25, and outlet line 26 for the finished product are also provided. Regenerated solvent is withdrawn from stripper 20 through bottom line 27 to join the solvent line 12 for recontact with more of said mixture in said column 10. Line 28 is provided for addition of free solvent through the system as required.

Instead of introducing only one of the solvents in the distillation column, mixtures of the aforementioned solvents can be also employed as, for example, a mixture of methyl-isobutyl-ketone and methyl-n-amyl-ketone or a mixture of xylene and p-cymene.

Also ternary mixtures of the alcohols can be separated into their components in a similar manner by first separating one of the components from the other two, and then separating the remaining two components. Thus, mixtures of ethyl alcohol, isopropyl alcohol, and tertiary butyl alcohol can be separated, by first removing the ethyl alcohol in the manner described above. The isopropyl alcohol and tertiary butyl alcohol are then stripped from the bottom solution, and the vapors of the two alcohols subjected to the same treatment with the same solvent as the original mixture to separate the isoproyl alcohol from the tertiary butyl alcohol.

The following example will serve to illustrate the invention:

*Example*

A 50 mol per cent mixture of ethanol and isopropanol is introduced as a vapor into the column 10 through feed line 11, the solvent feed being introduced through feed line 12. Individual runs were made with o-xylene, methyl-isobutyl-ketone, and methyl-n-amyl-ketone as the selective solvent. The operations were carried out continuously as described above in connection with the figure, samples of the overhead being taken periodically. The substantially pure ethanol was withdrawn through outlet line 18 and the substantially pure isopropanol through outlet line 26. It was found that with each of the above mentioned solvents, a greater separation of the ethanol and isopropanol was effected than could be obtained in the case where the column was operated under total reflux without the presence of such a solvent.

In a similar manner, mixtures of ethyl alcohol and tertiary butyl alcohol and of isopropyl alcohol and tertiary butyl alcohol can also be separated.

Instead of employing the three solvents set forth in the above example, other solvents such as the aromatic and paraffinic hydrocarbons mentioned hereinabove can be employed to increase the relative volatility of ethanol to isopropanol, as long as they do not form an azeotrope with either ethanol or isopropanol.

Copending application Serial No. 146,138, filed February 24, 1950, by the instant inventor, discloses and claims divisional subject matter.

I claim:

1. A process of separating a mixture of ethyl alcohol and isopropyl alcohol which comprises extractively distilling said mixture in the presence of methyl-isobutyl-ketone.

2. A process of separating a mixture of ethyl alcohol and isopropyl alcohol which comprises extractively distilling said mixture in the presence of methyl-n-amyl-ketone.

3. A process of separating a mixture of two or more saturated unsubstituted aliphatic alcohols containing not more than four carbon atoms and having closely related boiling points which comprises extractively distilling the mixture in the presence of a solvent selected from the group consisting of methyl-isobutyl-ketone and ketones boiling higher than methyl-isobutyl-ketone, which solvent has a boiling point sufficiently above that of the highest boiling alcohol in the mixture that it does not form an azeotrope therewith.

4. A process according to claim 3 wherein a mixture of ethyl alcohol and isopropyl alcohol is separated.

5. A process according to claim 3 wherein a mixture of ethyl alcohol and tertiary butyl alcohol is separated.

6. A process according to claim 3 wherein a mixture of isopropyl alcohol and tertiary butyl alcohol is separated.

EDWARD GEORGE SCHEIBEL.

REFERENCES CITED

The following references are of record in the file of this patent:

UNITED STATES PATENTS

| Number | Name | Date |
|---|---|---|
| 2,107,265 | Archibald | Feb. 8, 1938 |
| 2,339,160 | Dunn et al. | Jan. 11, 1944 |
| 2,483,246 | Stribley | Sept. 27, 1949 |

OTHER REFERENCES

Journal of Research of the National Bureau of Standards, vol. 27, pp. 39–63, July 1941.